United States Patent [19]
Johnson

[11] 4,201,738
[45] May 6, 1980

[54] PREPARATION OF $U_3O_8$

[75] Inventor: David R. Johnson, Aiken, S.C.

[73] Assignee: The United States of America as represented by the United States Department of Energy, Washington, D.C.

[21] Appl. No.: 936,460

[22] Filed: Aug. 24, 1978

[51] Int. Cl.$^2$ .................................... G21C 21/00
[52] U.S. Cl. .......................... 264/0.5; 260/429.1; 423/260
[58] Field of Search ............... 260/429.1; 264/0.5; 423/260

[56] References Cited

U.S. PATENT DOCUMENTS 3,167,388    1/1965    Rhodes ........................... 423/260

Primary Examiner—Leland A. Sebastian
Attorney, Agent, or Firm—R. V. Lupo; Allen F. Westerdahl

[57] ABSTRACT

A method is described for the preparation of $U_3O_8$ nuclear fuel material by direct precipitation of uranyl formate monohydrate from uranyl nitrate solution. The uranyl formate monohydrate precipitate is removed, dried and calcined to produce $U_3O_8$ having a controlled particle size distribution.

7 Claims, 1 Drawing Figure

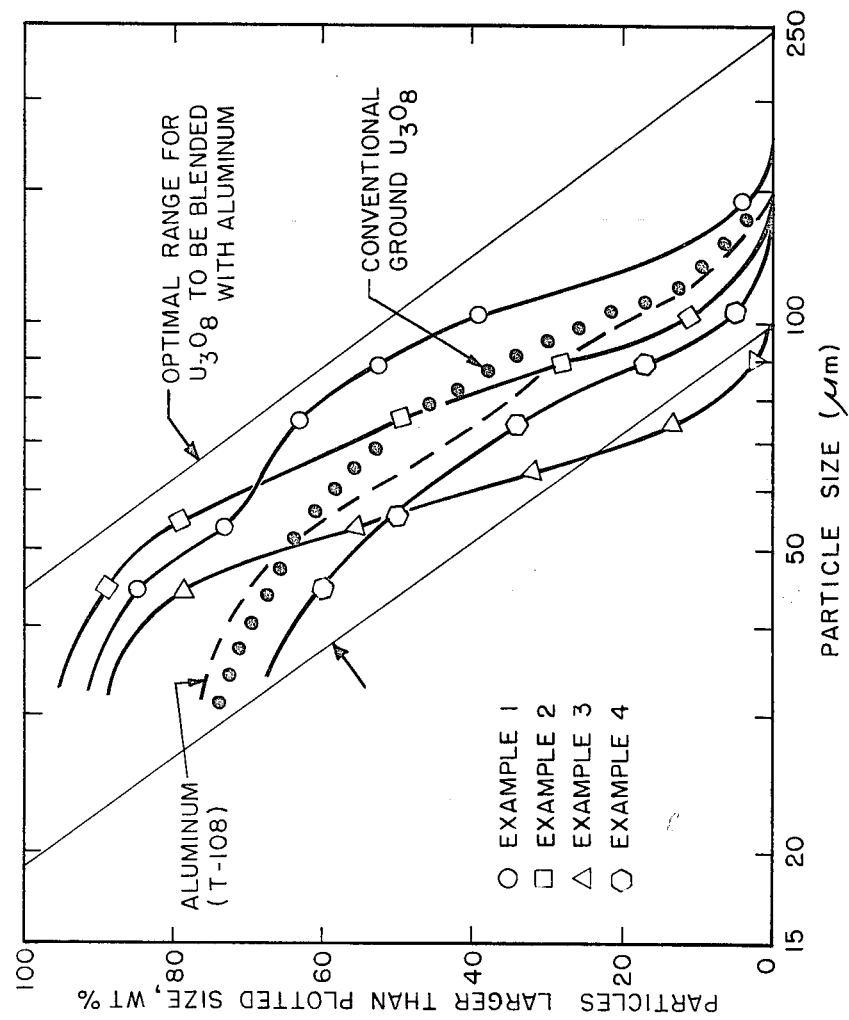

PREPARATION OF $U_3O_8$

BACKGROUND OF THE INVENTION

This invention was made in the course of, or under, a contract with the U.S. Department of Energy.

This invention relates to a method of preparing $U_3O_8$ for use as a nuclear fuel material, in particular, for directly preparing $U_3O_8$ having a controlled particle size distribution from an aqueous solution of uranyl nitrate. The invention is particularly useful for the recycle of enriched uranium in the powder metallurgy manufacture of $U_3O_8$-Al nuclear reactor fuel assemblies.

In powder metallurgy processes for the preparation of $U_3O_8$ nuclear fuel material, control of the particle size is required to provide a compatible blend of the $U_3O_8$ fuel material and the aluminum matrix material, and to provide the desired physical and nuclear characteristics of the product $U_3O_8$-Al fuel cores. Careful control of $U_3O_8$ particle size distribution is necessary because (1) particles or agglomerates larger than 150 $\mu$m tend to form large hard particles that can penetrate nuclear fuel cladding and cause undesirable hot spots and result in melting of the cladding during irradiation, (2) fuel containing 40 wt % or more of particles smaller than 44 $\mu$m is susceptible to fission-gas blistering during irradiation, and (3) the particle size distribution of the $U_3O_8$ must match the particle size of the aluminum powder matrix material to obtain a sufficiently homogeneous $U_3O_8$-Al blend for isostatic compaction. This last factor has been established empirically as a particle size range of between about 150 and 44 $\mu$m, based on the first two factors and on the particle size distribution of commercially available aluminum powder for powder metallurgical processes. One such commercial aluminum powder is Alcoa Atomized Powder No. T-108, available from the Aluminum Company of America, Pittsburgh, Pennsylvania 15219, which has an optimum particle size range for the preparation of the $U_3O_8$-Al fuel cores.

Heretofore, $U_3O_8$ nuclear fuel material for use in the manufacture of $U_3O_8$-Al powder metallurgy compacts for nuclear fuel has been obtained by calcining $UO_3$ prepared by the thermal denitration of uranyl nitrate solution. The $UO_3$ prepared by this conventional process has a particle size distribution of between about 150-600 $\mu$m. Calcining the $UO_3$ to $U_3O_8$ does not reduce the particle size to the desired range; thus, the $U_3O_8$ prepared by this process must be ground and sized to achieve a particle size distribution compatible with aluminum powder for powder metallurgy processing. See, for example, A Chemical Recovery System for Safeguarding Unirradiated Uranium, USAEC Report Y-MA-3582, July 1, 1970, p.10. However, grinding the $U_3O_8$ is undesirable because (1) it is a slow operation, (2) it generates excessive fine particles, (3) it presents a potential for release of radioactive contaminates, and (4) it leads to $U_3O_8$ powder buildup in the grinding equipment.

In view of the difficulties associated with the conventional process described above, those skilled in the art will recognize that a number of uranium salts, such as uranyl or uranous oxalate and uranyl or uranous formate, prepared from uranyl nitrate may serve as possible intermediate salts for preparing $U_3O_8$ having the desired particle size range. However, tests conducted by precipitation and calcination of the uranium oxalates and uranous formate did not produce $U_3O_8$ with the appropriate particle size distribution. Further, attempts were made to prepare $U_3O_8$ having a uniform particle size range by the evaporation of solvent from an unsaturated uranyl formate solution followed by calcination to $U_3O_8$. While this method produced an excellent yield of uranium, the dry product, even when stirred during evaporation, consisted of undesirably large particle agglomerates clearly unsuitable for compatible powder metallurgy use without grinding and particle sizing. One solution that has been suggested for the problem of agglomeration in the precipitation of uranyl formate is disclosed in United Kingdom Patent Specification No. 1,230,937, published May 5, 1971. In this U.K. patent uranyl nitrate is precipitated with formic acid in a vertical column partially filled with glass balls. Stirring the glass balls during the reaction serves to dry and grind the resulting precipitate to yield a dry uranyl formate powder. There is no indication in this patent of particle size, particle size distribution, or whether the product will calcine to a suitable $U_3O_8$ powder.

SUMMARY OF THE INVENTION

Therefore, it is the object of the present invention to provide a method for the direct preparation of $U_3O_8$ nuclear fuel material having a controlled particle size distribution from uranyl nitrate solution. It is also an object of this invention to provide a method for the preparation of $U_3O_8$ for the powder metallurgical manufacture of nuclear fuel that does not require the grinding of the $U_3O_8$. It is a still further object to provide $U_3O_8$ in powder form that has a particle size distribution compatible with a matrix material for the manufacture of nuclear fuel material.

In accordance with the present invention, $U_3O_8$ having a controlled particle size distribution is directly prepared from an aqueous solution of uranyl nitrate by adding formic acid to effect a denitration and form an unsaturated solution of uranyl formate. Additional stoichiometric excess of formic acid is added to the unsaturated uranyl formate to precipitate uranyl formate monohydrate. The resulting crystalline uranyl formate monohydrate is then calcined to produce $U_3O_8$ having a controlled particle size distribution. It has been found that $U_3O_8$ powder prepared by this technique has the following desirable physical characteristics: (1) no large particles, (2) crystalline particle morphology, and (3) narrow particle size distribution that is compatible with aluminum powder. The foregoing properties are achieved without grinding or sieving operations.

BRIEF DESCRIPTION OF THE DRAWINGS

The accompanying FIGURE is a graphic representation of the particle size distribution of $U_3O_8$ powders prepared by the method of this invention compared with $U_3O_8$ prepared by conventional grinding and with a sample of commercial aluminum powder.

DESCRIPTION OF A PREFERRED EMBODIMENT

The starting solution for the process of the present invention is uranyl nitrate preferably in a concentration range of between about 200 and 300 gU/l at about 2M $HNO_3$. The concentrated uranyl nitrate is batch denitrated using conventional apparatus and procedures by the controlled addition of formic acid to the hot uranyl nitrate solution. One conventional technique is described in Denitration of Nitric Acid Solution by Formic Acid, USAEC Report DP-1299, 1972. While the formic acid concentration by itself is not critical, the rate of addition of formic acid should be in the range of between about 0.30 to about 0.70 moles/(min)(liter of uranyl nitrate feed). The preferred concentration for the use of this feed rate is a concentration at or in excess of 77.5% or 19.9 M formic acid. Formic acid concentrations as low as 50% and as high as 90% may be used provided appropriate adjustment is made for the feed rate, the solution temperature, and the off gas removal system. As in conventional denitration, the solution temperature is maintained at about 90° C. for a period of about one to two hours in the presence of excess formic acid to assure complete denitration. Although excess formic acid is added during denitration, the solution acid concentration must be controlled to about 0.3 moles per 100 grams of solution to prevent uranyl formate monohydrate precipitation during the denitration step. Such uncontrolled or premature precipitation could adversely effect the particle size distribution of the precipitated salt. Thus, the carefully controlled denitration step produces an unsaturated solution of uranyl formate containing all of the uranium from the feed uranyl nitrate solution.

Unsaturated uranyl formate solution from the denitration step and at the denitration temperature of about 90° C. is then contacted with additional formic acid to precipitate uranyl formate monohydrate. The formic acid is added in sufficient stoichiometric excess and at a rate selected to control the nucleation and growth of crystalline particles during precipitation and to yield the desired particle size distribution for powder metallurgical requirements. Formic acid preferably at or in excess of 19.9 M concentration is added at a rate of between about 0.40 and 1.27 moles/(min)(liter of uranyl nitrate feed) to raise the solution acid concentration from about 0.3 to about 1.4 moles/100 g of solution. A higher concentration of formic acid (about 1.6 to 1.7 moles/100 g solution) is achieved by conventional volume reduction (evaporation) and controlled addition of small quantities of 90% formic acid. At this concentration the solution and precipitate are cooled to ambient room temperature (about 25° C.). The precipitate is then recovered by filtration. The precipitate is washed during this step with 90% formic acid to remove residual contaminants. The filter cake, consisting essentially of substantially pure uranyl formate monohydrate $(UO_2(HCOO)_2.H_2O)$, is then dried at 110° to 120° C. for one to four hours to provide a crystalline uranyl formate monohydrate salt.

At this stage the crystalline formate salt, which has a uniform particle size distribution, is suitable for calcining to $U_3O_8$. Calcining is conducted in a conventional manner in a static bed by heating the salt in air at about 10° C. per minute to a final temperature of about 800° C. to produce a free-flowing crystalline $U_3O_8$ powder having a controlled particle size distribution. The calcination temperature is maintained for 4 to 8 hours to ensure complete conversion to $U_3O_8$ product.

For the purpose of this specification, the word "controlled" when used in connection with "particle size" may be defined as having a "uniform narrow range" of particle size compatible with powder metallurgical grade aluminum powder and suitable for powder metallurgical use. The $U_3O_8$ product may be further characterized as a $U_3O_8$ powder consisting essentially of discrete crystalline $U_3O_8$ particles with a minimum of particle agglomeration. The bulk morphology of the calcined $U_3O_8$ powder is very similar to the crystalline uranyl formate monohydrate prior to calcination. Also, because of the crystalline morphology of the uranyl formate monohydrate, calcination to $U_3O_8$ does not result in significantly reduced particle size.

Having described a preferred embodiment, the following specific examples will serve to further illustrate the present method of preparing $U_3O_8$ for powder metallurgical use:

EXAMPLE I

To demonstrate the feasibility of preparing $U_3O_8$ having a controlled particle size distribution, an exemplary feed solution (85 ml) was prepared of uranyl nitrate having a concentration of 250 gU/l at 2 M $HNO_3$. Feed solution was contacted in suitable denitration apparatus with 70 ml of 19.9 M formic acid at a feed rate of 0.70 moles formic acid/(min)(liter of uranyl nitrate feed) solution at a temperature of 90° C. Sufficient formic acid was added to achieve a concentration of 0.3 moles /100 grams of solution at the completion of denitration. The solution was digested for one hour after completion of the formic acid addition to assure complete denitration and formation of an unsaturated solution of uranyl formate. An additional 365 ml of 19.9 M formic acid was added to the unsaturated uranyl formate solution at a feed rate of 1.27 moles/(min)(liter of uranyl nitrate feed) at 90° C. to precipitate uranyl formate monohydrate. To maximize uranium precipitation the formic acid was added until the solution acid concentration reached 1.4 moles/100 g of solution. The solution was evaporated to reduce the solution volume by 60% and adjusted with 75 ml of 90% formic acid. The slurry was cooled to ambient temperature and the precipitate recovered by filtration at a formic acid concentration of 1.7 moles/100 g solution. The precipitate was washed with 90% formic acid and the resulting filter cake was dried at 110° C. for 2 hours to provide crystalline uranyl formate monohydrate salt. This salt was then calcined in a static bed in an air atmosphere at 800° C. for 6 hours. The resulting product was a crystalline free-flowing $U_3O_8$ powder having the particle size distribution shown in the FIGURE of the attached drawing.

EXAMPLE II

Using the same feed solution, concentrations and procedure as in Example I, and with volumes adjusted to reflect the larger quantity of feed, $U_3O_8$ was prepared from a 170 ml uranyl nitrate sample. In this example, formic acid was added to the feed solution for denitration at a rate of 0.36 moles/(min)(liter of uranyl nitrate feed) and to the precipitation step at a rate of 0.63 moles/(min)(liter of uranyl nitrate feed). Calcination of the resulting precipitate produced a crystalline $U_3O_8$ powder having the particle size distribution shown in the attached FIGURE.

EXAMPLE III

Another feed solution containing uranyl nitrate at a concentration of 207 gU/l was processed using 90% formic acid at denitration and precipitation feed rates of 0.35 and 0.63 moles/(min)(liter of uranyl nitrate feed), respectively. The crystalline $U_3O_8$ powder resulting from calcination of the uranyl formate monohydrate precipitation had a particle size distribution as shown in the attached FIGURE.

EXAMPLE IV

A uranyl nitrate solution having 227 gU/l was processed using 90% formic acid at denitration and precipitation feed rates of 0.24 and 0.42 moles/(min)(liter of uranyl nitrate feed), respectively. The $U_3O_8$ powder particle size distribution resulting from this example is also shown in the attached FIGURE.

It will be noted from an examination of the accompanying FIGURE that the particle size distribution of $U_3O_8$ prepared by the process described in Examples I through IV compare favorably with powder metallurgical grade aluminum powder. In all cases the $U_3O_8$ powder prepared from the controlled precipitation of uranyl formate monohydrate displayed the desirable physical characteristics of (1) no large particles, (2) crystalline particle morphology, and (3) a narrow uniform particle size distribution that matched that of the aluminum powder.

What is claimed is:

1. The method of directly preparing $U_3O_8$ nuclear fuel material having a controlled particle size distribution from an aqueous solution of uranyl nitrate which comprises
   (a) contacting said uranyl nitrate solution with sufficient formic acid to effect a denitration of said solution and to form an unsaturated solution of uranyl formate;
   (b) further contacting said unsaturated uranyl formate solution with additional formic acid in sufficient stoichiometric excess of formic acid to precipitate uranyl formate monohydrate from said solution;
   (c) removing and drying said precipitate to provide a crystalline uranyl formate monohydrate; and
   (d) calcining said crystalline uranyl formate monohydrate to produce $U_3O_8$ nuclear fuel material having a controlled particle size distribution.

2. The method of claim 1 wherein the temperature of said denitration is maintained at about 90° C.

3. The method of claim 1 wherein the concentration of said formic acid is in excess of about 19 M.

4. The method of claim 1 wherein the rate of addition of formic acid to said unsaturated uranyl formate solution is controlled to provide a substantial portion of said $U_3O_8$ nuclear fuel material with a particle size that does not exceed about 150 μm.

5. The method of claim 1 wherein the amount of and rate of addition of formic acid to said uranyl nitrate solution in step (a) is controlled to effect complete denitration and to prevent precipitation of uranyl formate during said denitration.

6. The method of claim 1 wherein said calcining is conducted in air by heating said crystalline uranyl formate monohydrate at a rate of about 10° C. per minute to a temperature of about 800° C.

7. The method of claim 4 wherein the formic acid is added at a rate of between about 0.40 and 1.27 moles/(min)(liter of uranyl nitrate solution).